United States Patent
Ichioka et al.

(10) Patent No.: US 6,253,975 B1
(45) Date of Patent: Jul. 3, 2001

(54) CUP HOLDER INSTALLED IN VEHICLE

(75) Inventors: Hiroaki Ichioka; Satoshi Yamada; Kiichiro Ito, all of Yokohama (JP)

(73) Assignee: Piolax, Inc., Kanagawa-ken (JP)

( * ) Notice: Subject to any disclaimer, the term of this patent is extended or adjusted under 35 U.S.C. 154(b) by 0 days.

(21) Appl. No.: 09/510,944

(22) Filed: Feb. 22, 2000

(51) Int. Cl.[7] .................................. B60R 7/04; B60R 7/06
(52) U.S. Cl. ...................... 224/281; 224/926; 248/311.2
(58) Field of Search ..................................... 224/281, 926; 248/311.2; 297/188.11, 188.15, 188.16, 188.17

(56) References Cited

U.S. PATENT DOCUMENTS

| | | | |
|---|---|---|---|
| 5,060,899 | * 10/1991 | Lorence et al. | 248/311.2 |
| 5,141,194 | * 8/1992 | Burgess et al. | 248/311.2 |
| 5,395,084 | * 3/1995 | Ikuma | 224/926 X |
| 5,427,447 | * 6/1995 | Satoh | 297/188.17 X |
| 5,620,228 | * 4/1997 | Ito et al. | 248/311.2 |
| 5,628,486 | * 5/1997 | Rossman et al. | 248/311.2 |
| 5,692,658 | * 12/1997 | Fischer et al. | 224/926 X |
| 5,800,005 | * 9/1998 | Arold et al. | 248/311.2 X |
| 5,803,421 | * 9/1998 | Kerner et al. | 224/281 X |
| 5,857,633 | * 1/1999 | Pelchat, II et al. | 224/926 X |
| 5,860,630 | * 1/1999 | Wildey et al. | 224/926 X |
| 5,941,491 | 8/1999 | Plocher et al. | 248/311.2 |
| 5,944,240 | * 8/1999 | Honma | 224/926 X |

FOREIGN PATENT DOCUMENTS

| | | | |
|---|---|---|---|
| 19534435A1 | 3/1997 | (DE) | B60N/3/10 |
| 19636825A1 | 3/1998 | (DE) | B60N/3/10 |
| 6211079 | 8/1994 | (JP) . | |

OTHER PUBLICATIONS

International Search Report

* cited by examiner

Primary Examiner—Gregory Vidovich
(74) Attorney, Agent, or Firm—Howard & Howard

(57) ABSTRACT

A cup holder for a vehicle includes a housing 1 fixed on the vehicle's side, a slide member 11 movably supported in the housing back and forth, and a holder body 21 provided with two holding hole 22 for holding cups and movably supported by the slide member 11 left and right. The holder body 21 has its rear part whose one side portion is cut away slantingly so that a width of the rear part is smaller than that of a front part of the holder body 21. The cup holder further includes a tensile coil spring 31 between the slide member 11 and the holder body 21, for urging the holder body 21 to one lateral direction of the slide member 11 by the spring 31. Owing to the provision of the spring 31, the handling of the holder body 21 can be completed under a little resistance, improving the manipulating feeling.

8 Claims, 8 Drawing Sheets

CUP HOLDER INSTALLED IN VEHICLE

BACKGROUND OF THE INVENTION

1. Field of the Invention

The present invention relates to the improvement of a retractable cup holder arranged in a center cluster of an automotive dashboard.

2. Description of the Invention

Japanese Patent Publication No. 6-211079 discloses a cup holder. This cup holder, though it is not shown, includes a housing fixed on the center cluster's side, a slide member carried in the housing so as to be movable back and forth, and a holder body supported by the slide member so as to be movable to right and left. The holder body has one or more retaining holes formed to hold cups for drinks.

The housing is provided, on a bottom wall thereof, with a guide groove for guiding the movement of the holder body. The guide groove is formed so as to extend from the front side of the housing to the rear side continuously. Further, the guide groove includes a groove part slanted to a direction to draw the holder body out of the housing. While, the holder body is provided, on a rear side thereof, with an engagement projection which slides in the guide groove. This holder body consists of a front part and the rear part in the moving direction. The rear part of the holder body has one side portion formed so as to cut away slantingly. Owing to the provision of the slanted side portion, the width of the rear part becomes to be smaller than that of the front part of the holder body.

Therefore, when the holder body is drawn out of the housing in the conventional cup holder, then the slide member is also moved forward in association with the holder body. During this movement, the engagement projection of the holder body slides in the guide groove of the housing from the rear side to the front side. Due to the above slanted part in the middle of the guide groove, the holder body is drawn and slid laterally to the housing, corresponding to an inclination angle of the slanted part. On the other hand, the slide member is simply moved forward. Thereafter, if only disposing the cups in the retaining holes, then an user can use the holding body as the cup holder.

While, in case of pushing the holder body, which has been drawn out of the housing in combination with the slide movement, into the housing, the slide member is also urged into the housing straightly. At this time, since the engagement projection of the holder body does slide toward the rear side of the guide groove via the oblique part, the holder body is accommodated into the housing while following the opposite tracing order, thereby effecting the unusable condition.

According to the conventional cup holder, the holder body is shifted sideways to the housing when the body is drawn out of the housing completely. Therefore, different from a case that the holder body is drawn out straightly, there is no possibility that the manipulation of instruments installed in the center cluster, for example, audio instruments or a shifting lever is interrupted by the presence of the holder being drawn out of the housing.

In the above-mentioned cup holder, however, the drawing of the holder body requires the engagement projection to be slid in the slanted guide groove part forcibly. Consequently, when extracting the holder body from the housing or inserting the body into the housing, the user has been subjected to resistance due to forcible sliding, causing the manipulating feeling to be deteriorated disadvantageously.

SUMMARY OF THE INVENTION

Under such a circumstance, it is therefore an object of the present invention to provide a cup holder which does not deteriorate its manipulating feeling because of a reduced resistance in handling a holder body.

The object of the present invention described above can be accomplished by a cup holder for a vehicle, comprising:

a housing fixed on the vehicle's side;

a slide member movably supported in the housing back and forth;

a holder body provided with at least one holding hole for holding a cup and movably supported by the slide member left and right, the holder body having its rear part whose one side portion is cut away slantingly so that a width of the rear part is smaller than that of a front part of the holder body; and an elastic urging element arranged between the slide member and the holder body for urging the holder body to one lateral direction of the slide member by an urging force of the elastic urging element;

wherein the holder body can be drawn out of the housing while being slid laterally to the housing through the slide member.

In the above-mentioned invention, since the holder body is urged to one lateral direction of the slide member by the elastic urging element, a large resistance is not produced in handling the holder body any longer. Thus, it is possible to eliminate the possibility of deteriorating the manipulating feeling.

According to the second aspect of the present invention, the cup holder further comprises a stopper mechanism for preventing the holder body from moving to the other lateral direction of the slide member in opposition to the urging force of the elastic urging element on condition that the holder body is completely drawn out of the housing.

Owing to the provision of the stopper mechanism, it will be possible to ensure the stable usable condition even if an unexpected external force is applied on the holder body.

According to the third aspect of the present invention, the stopper mechanism comprises a claw projecting on the rear part of the holder body and a stopper arm formed on the housing, for engagement with the claw.

In this case, when the holder body is completely drawn out of the housing, the claw projecting on the rear part of the holder body engages with the stopper arm formed on the housing, ensuring the above stable usable condition.

According to the fourth aspect of the present invention, the holder body has a projecting piece formed close to the claw, while the housing is provided with another projection which is engageable with the projecting piece on condition that the holder body is accommodated in the housing.

In this case, owing to the engagement of the projecting piece with the projection of the housing, it is possible to prevent the holder body from being inclined in the housing, effectively.

Alternatively, according to the fifth aspect of the present invention, the holder body has a receiver pivoted thereto for receiving a bottom of the cup by one end of the receiver and the stopper mechanism comprises an extension piece formed on the other end of the receiver and an engagement hole formed in the housing for engagement with the extension piece.

In this case, when the holder body is completely drawn out of the housing, the extension piece of the receiver is engaged in the engagement hole of the housing, so that the above stable usable condition can be ensured.

According to the sixth aspect of the invention, in the present invention, the elastic urging element comprises a tensile spring having one end hooked to the holder body and the other end hooked to the slide member.

In this case, owing to the using of the tensile spring, it is possible to miniaturize the whole cup holder.

These and other objects and features of the present invention will become more fully apparent from the following description and appended claims taken in conjunction with the accompany drawings.

DESCRIPTION OF THE PREFERRED EMBODIMENT

One preferred embodiment of the present invention will be described with reference to the drawings.

Figure 1:
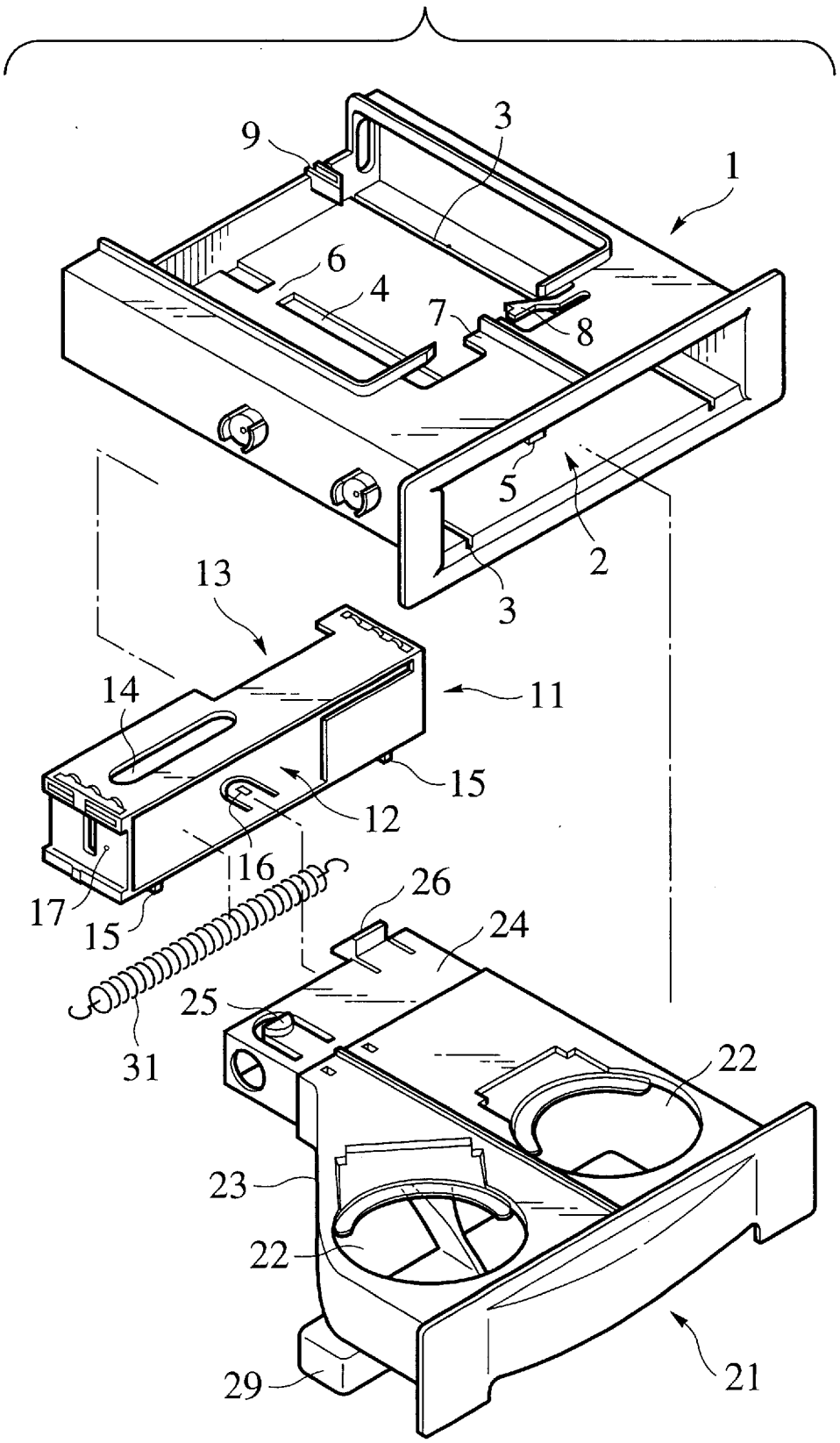
FIG. 1 is a perspective view of a cup holder in accordance with an embodiment of the present invention, showing the cup holder being exploded from its outside.
Figure 2:
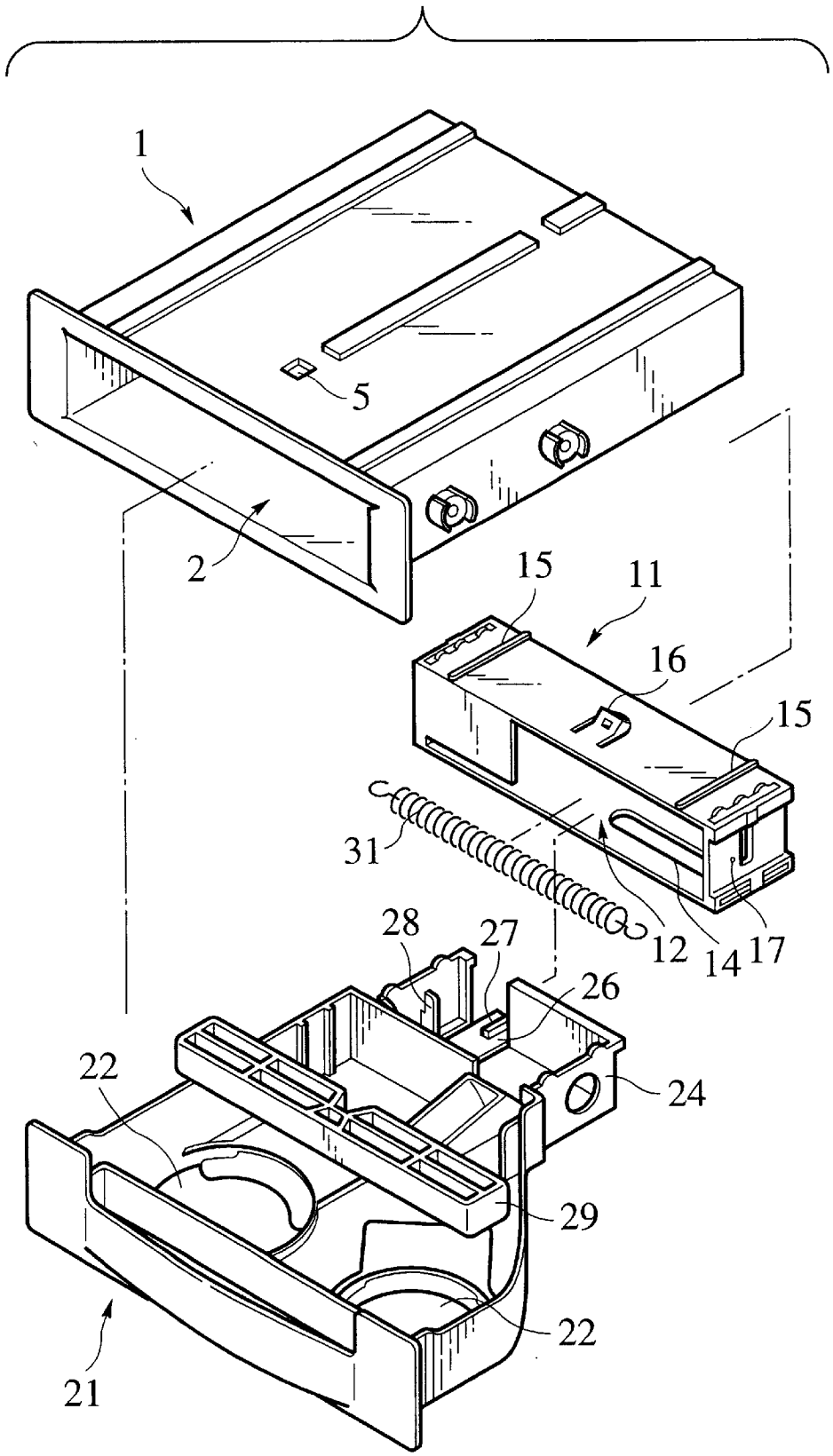
FIG. 2 is a perspective view showing the cup holder of FIG. 1, exploded from its outside; a condition before a shield wire is connected to a terminal body of the cup holder.

As shown in FIGS. 1 and 2, the cup holder of the embodiment also includes a housing 1 fixed on the side of a center cluster of an automotive dashboard, a slide member 11 carried in the housing 1 so as to be movable back and forth, and a holder body 21 supported by the slide member 11 so as to be movable to right and left with respect to the slide member 11. The holder body 21 is provided with retaining holes 22 which serve to hold cups for drinks by the cup holder.

The housing 1 is provided in the form of a box which consists of a front wall, opposing side walls, an upper wall, a back wall and a bottom wall. In these walls, the upper and back walls are partially opened in succession. The front wall is provided with an opening 2 through which the holder body 21 is to be drawn in and out. On both sides of the bottom wall, a pair of first guide grooves 3 of small widths are continuously formed so as to extend from the back wall up to the edge of the opening 2. While, a second guide groove 4 of large width is formed on the intermediate part of the bottom wall of the housing 1. The second guide groove 4 does not extend up to the opening 2 of the housing 1 but stops halfway. Instead, a locking hole 5 is formed close to the front end of the second guide groove 4 on the side of the opening 2. In the vicinity of the rear end of the groove 4, a locking wall 6 is formed so as to be perpendicular to the groove 4.

Further, the housing 1 has a butt part 7 formed at the substantial center of a margin of an opening formed in the upper wall, for abutment with a function claw 26 of the holder body 21, which will be described later. Beside the butt part 7, a single stopper arm 8 is provided for preventing the function claw 26 from shifting sideways. On one side of the back wall of the housing 1, a limit projection 9 is formed for engagement with a projecting piece formed on the under face of the function claw 26.

The slide member 11 is in the form of a long box which is movable back and forth in the housing 1. The slide member 11 is also provided, on a front wall thereof, with an inlet 12 into which a later-described narrow rear part of the holder body 21 is to be inserted. In the back wall of the holder body 21, another inlet 13 is formed to allow the movement of the function claw 26. The slide member 11 has a long guide hole 14 formed in the upper wall, for fitting a guide pin 25 of the holder body 21 movably, a pair of projecting rims 15 formed on both sides of the under face of the bottom wall, for moving in the first guide grooves 3 respectively, an elastic piece 16 formed at the center of the under face of the bottom wall, for moving in the second guide groove 4 respectively, and a hook part 17 formed in the sidewall close to the long guide hole 14, for hooking one end of a later-mentioned tensile coil spring.

In the holder body 21, the rear part having no retainer hole is cut away on one side so as to incline partially. Owing to the provision of a slanted face 23, the rear part of the holder body 21 has a narrow width in comparison with that of the front part. The above guide pin 25 for free engagement with the long guide hole 14 is formed on an extension wall 24 extending from the rear part, in the vicinity of the slanted face 23. On the opposite side of the guide pin 25, the triangular-shaped function claw 26 is provided, on the under face, with a projecting piece 27. On one sidewall defining the rear part of the holder body 21, a hooking part 28 is formed close to the function claw 26, for hooking the other end of the tensile spring 31. Note, reference numeral 29 designates a receiver which is pivoted to the under face of the holder body 21, for receiving respective bottoms of cups.

Therefore, since the tensile coil spring 31 as an elastic urging element is interposed between the hooking part 17 of the slide member 11 and the hooking part 28 on the extension wall 24 of the holder body 21, the holder body 21 is urged so as to move sideways against the slide member 11 by the spring pressure of the tensile coil spring 31.

In order to complete the so-constructed cup holder, the guide pin 25 on the rear extension wall 24 of the holder body 21 is firstly fitted in the long guide hole 14 with some play while hooking both ends of the tensile spring 31 to the hooking parts 17, 28, respectively. Consequently, the holder body 21 is adapted so as to be movable to the slide member 11 left and right. Subsequently, the slide member 11 carrying the holder body 21 is pushed into the housing 1 through the opening 2 while fitting the projecting rims 15 of the slide member 11 into the first guide grooves 3 of the housing 1. Consequently, together with the holder body 21, the slide member 11 is carried so as to be movable back and forth in the housing 1. With the arrangement of the slide member 11, if only fixing the housing 1 in the center cluster of the dashboard, then the cup holder itself can be automatically installed in the center cluster with ease although it is not shown in the figure.

In actual use, when the holder body 21 is drawn out from the inside of the housing 1, the slide member 11 begins to move forward in association with the holder body 21.

Figure 3:
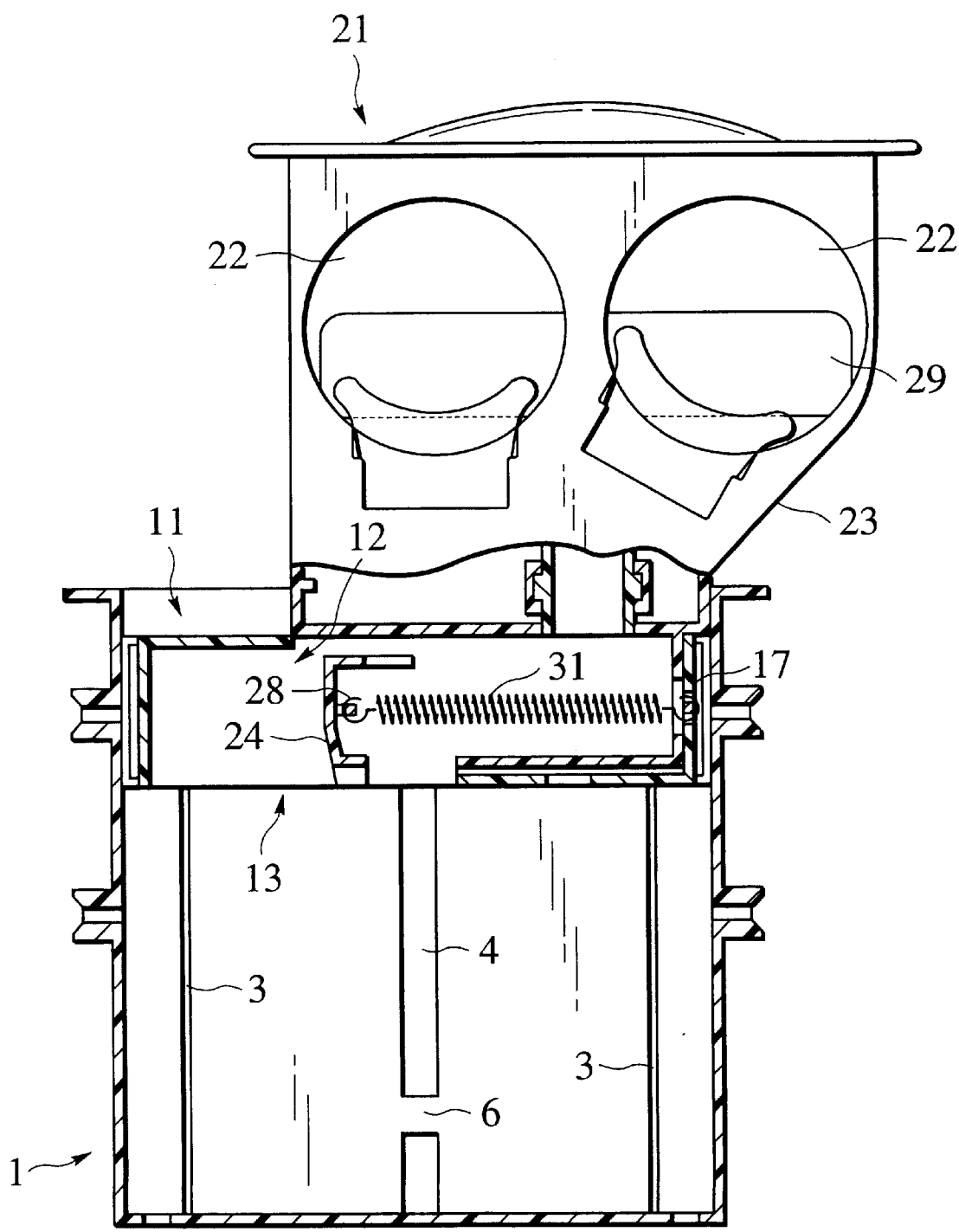
FIG. 3 is a cross sectional view of the cup holder of FIG. 1, showing a condition that a holder body is completely drawn out of a housing.

Subsequently, since the further drawing of the holder body 21 causes the inclined face 23 of the rear part of the holder body 21 to contact with the edge of the opening 2, the holder body 21 is drawn out while gradually moving toward the one lateral side of the slide member 11. When the elastic piece 16 of the slide member 11 engages with the locking hole 5 through the second guide groove 4, the forward moving of the slide member 11 is stopped and simultaneously, the holder body 21 is perfectly drawn out of the housing 1 while being slid to the lateral side, accomplishing the usable condition, as shown in FIG. 3.

Figure 4:
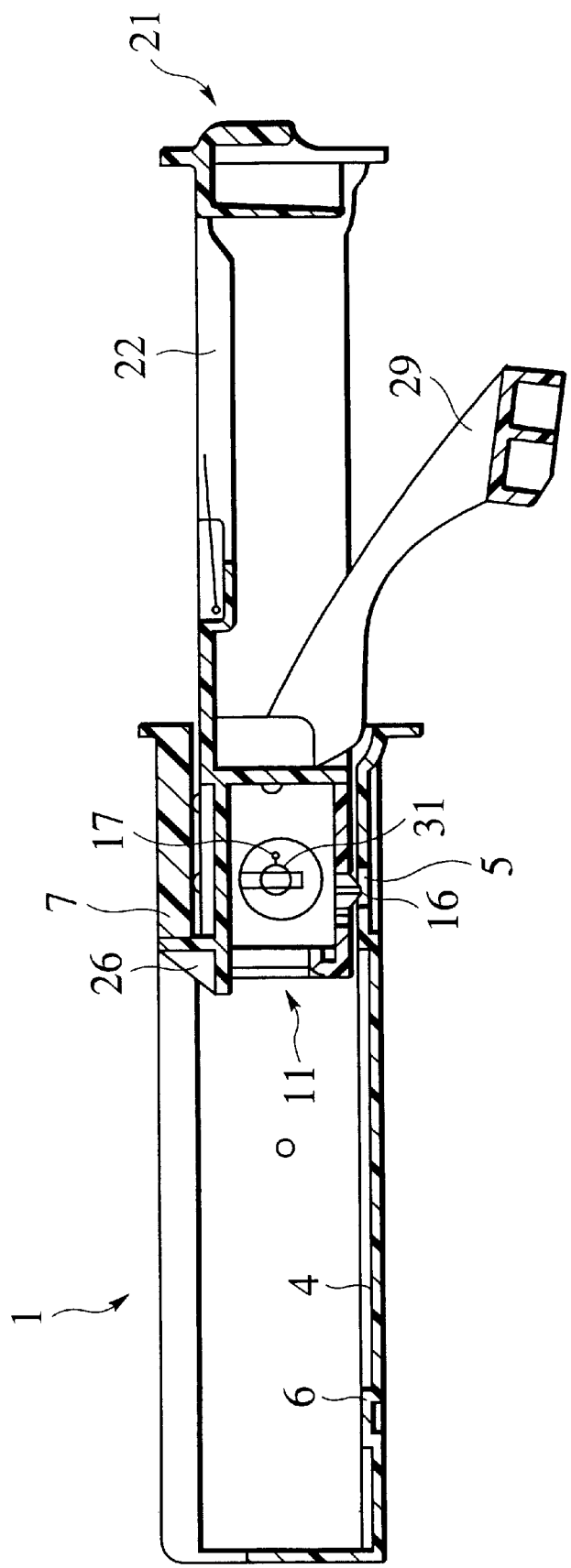
FIG. 4 is a longitudinal sectional view of the cup holder of FIG. 1.

Furthermore, the complete drawing-out of the holder body 21 causes the bottom receiver 29 to be rotated downward due to its own weight for preparation for mounting the cups thereon, as shown in FIG. 4. Thereafter, if only retaining the not-shown cups in the retaining holes 22, it is possible to realize the stabilized condition that the not-shown cups are held in the holes 22. Regarding the drawing-out of the holder body 21, it may be executed to firstly draw the holder body 21 out of the housing 1 together with the slide member 11 straightly and secondly slide the holder body 21 sideways of the housing 1 due to spring pressure of the tensile spring 31, automatically.

Figure 5:
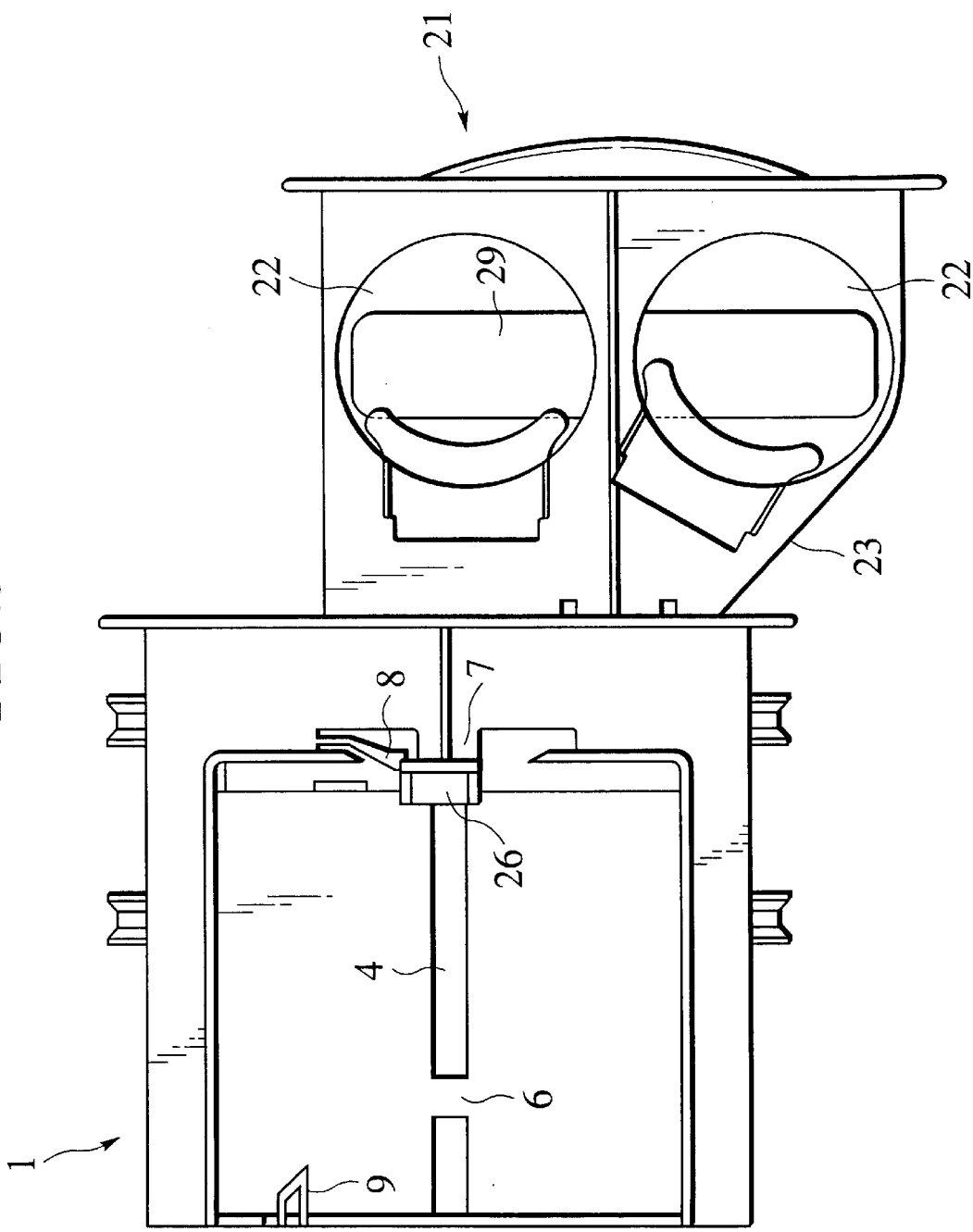
FIG. 5 is a plan view of the cup holder of FIG. 1, showing a condition that the holder body is completely drawn out of the housing.

Under the condition where the holder body 21 is completely drawn out, as soon as the function claw 26 of the holder body 21 comes into contact with the butt part 7 on the housing's side, the stopper arm 8 is engaged with the side face of the claw 26, as shown in FIG. 5. Therefore, even if any external force is applied on the holder body 21, it is possible to prevent the body 21 from being shifted to the other side in opposition to the spring force of the tensile spring 31, thereby ensuring the stabilized usable condition of the cup holder usually. Similarly to the conventional case, since the holder body 21 is shifted to one lateral direction of the housing 1, the drawn holder body 21 does not interrupt the passenger's manipulation of instruments (e.g. audio units) installed in the center cluster or a shifting lever.

Figure 6:
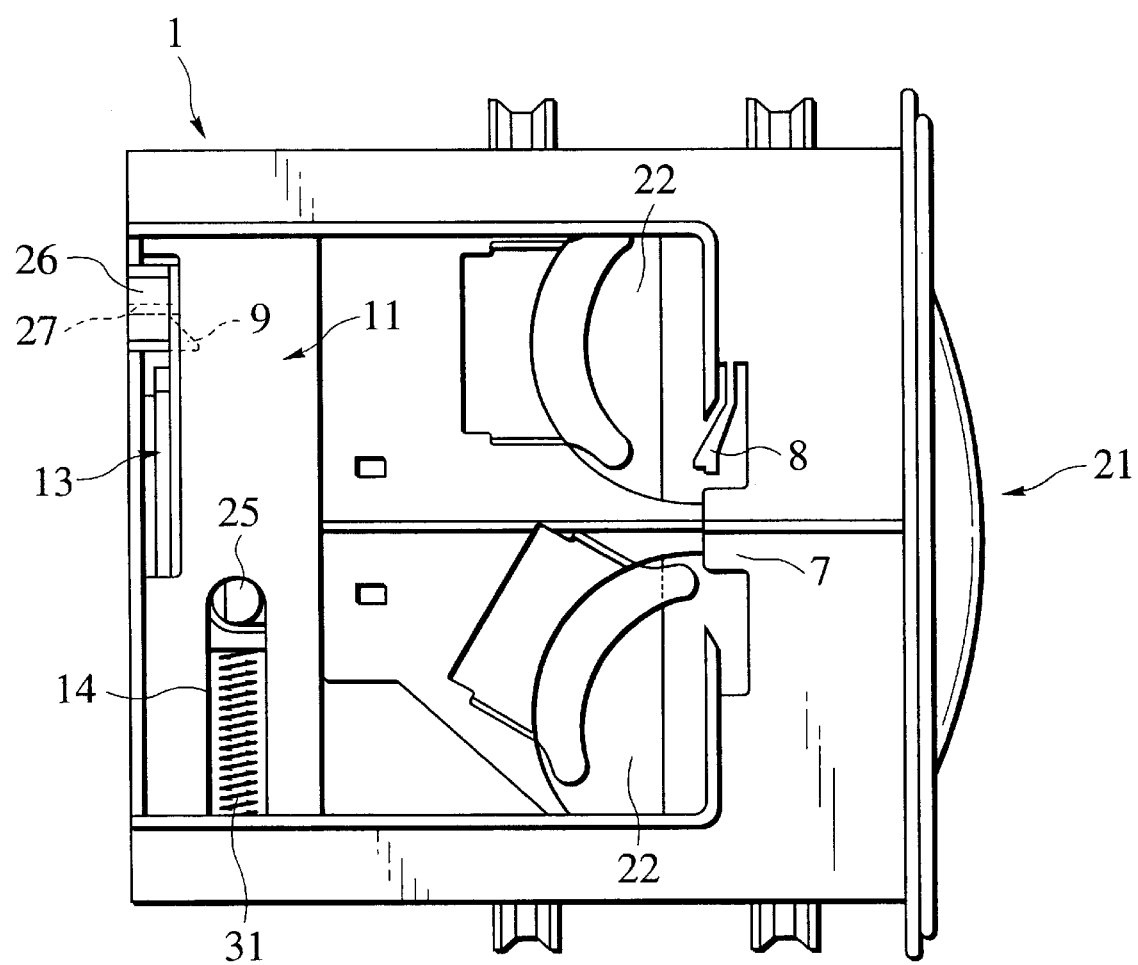
FIG. 6 is a plan view of the cup holder of FIG. 1, showing a condition that the holder body is accommodated in the housing.

Conversely, when pushing the holder body 21, which has been drawn out and slid laterally, into the housing 1, the slide member 11 is urged into the housing 1 linearly and simultaneously. In this process, when the inclined face 23 of the rear part of the holder body 21 comes into contact with the edge of the opening 2, the holder body 21 is urged and slid to the other lateral side of the slide member 11 in opposition to the spring force of the tensile coil spring 31. Finally, since the elastic piece 16 of the slide member 11 engages with the locking wall 6 of the second guide groove 4, the slide member 11 and the holder body 21 are accommodated in the housing 1, thereby accomplishing the unusable condition, as shown in FIG. 6.

Figure 7:
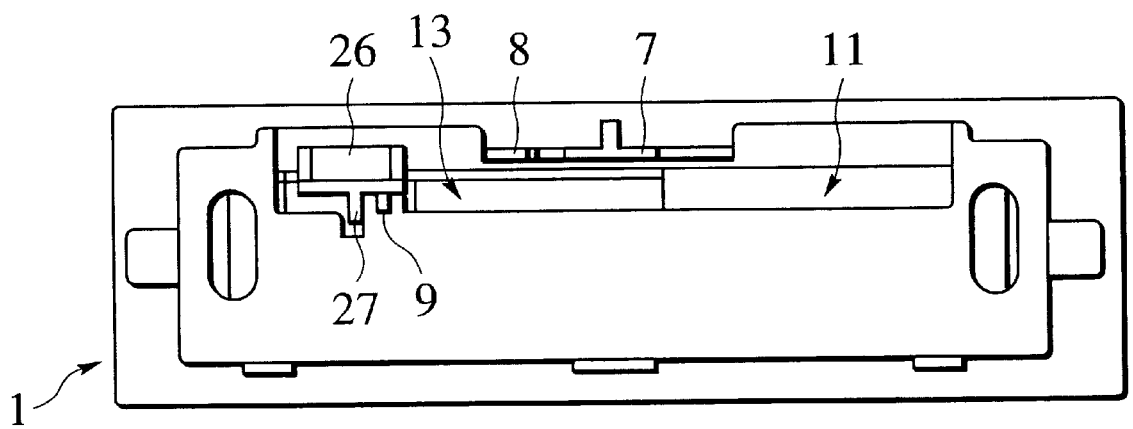
FIG. 7 is a back view of the cup holder of FIG. 1, showing a condition that the holder body is accommodated in the housing.

Then, it goes without describing that the bottom receiver 29 is retracted in the backside of the holder body 21 and accommodated in the housing 1. Simultaneously, as shown in FIG. 7, the projecting piece 27 of the function claw 26 engages with the side of the limit projection 9 and therefore, it is possible to prevent the inclination of the holder body 21 accommodated in the housing 1 effectively.

Figure 8:
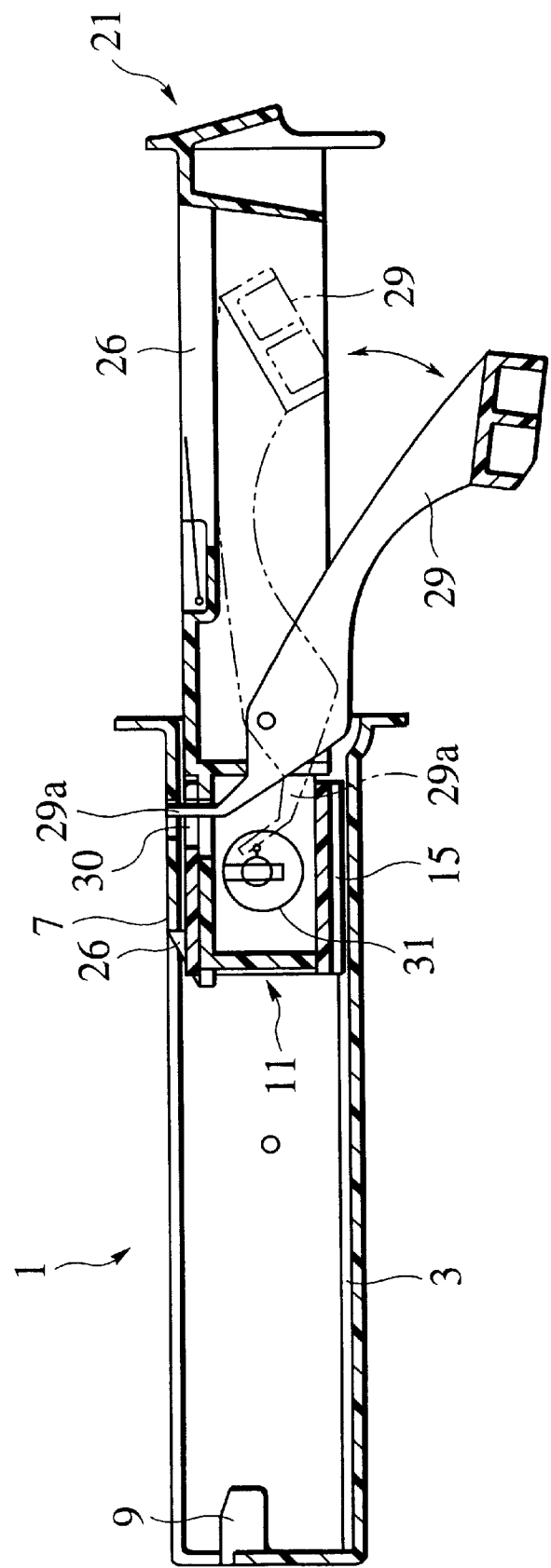
FIG. 8 is a sectional view showing another embodiment of stopper mechanism of the cup holder.

It will be understood by those skilled in the art that the foregoing description is one preferred embodiment of the disclosed cup holder, and that various changes and modifications may be made to the present invention without departing from the spirit and scope of the invention. For example, the function claw 26 and the stopper arm 8 constituting the stopper mechanism of the invention may be replaced with the structure of FIG. 8. In detail, an extension piece 29a is formed at the end of the bottom receiver 29, while an engagement hole 30 is formed so as to penetrate through the rear-side upper wall of the holder body 21, the front-side upper wall of the slide member 11 and the front-side upper wall of the housing 1. In operation, since the extension piece 29a of the bottom receiver 29 engages in the engagement hole 30 while the holder body 21 is drawn out of the housing 1 completely, the holder body 21 on use can be prevented from being shifted sideways.

What is claimed is:

1. A vehicle cup holder, comprising:
   a housing;
   a slide member movably supported by said housing;
   a holder body having at least one opening for a cup, said holder body supported by said slide member for slidable movement between an extended and a retracted position relative to said housing; and
   an elastic element attached to said slide member and said holder body to move said holder body relative to said housing in a direction perpendicular to the slidable movement direction of said slide member when said holder body is at said extended position.

2. A cup holder as claimed in claim 1, further comprising a stopper mechanism for preventing said holder body from moving in a direction perpendicular to a sliding direction of said slide member in opposition to the urging force of said elastic element when said holder body is at said extended position.

3. A cup holder as claimed in claim 1, wherein the elastic urging element comprises a tensile spring having one end hooked to the holder body and the other end hooked to the slide member.

4. A cup holder for a vehicle, comprising:
   a housing;
   a slide member slideably supported in said housing;
   a holder body provided with at least one holding hole for holding a cup and movably supported by said slide member, said holder body movable between an extended position and a retracted position; and
   an elastic element attached to said slide member and said holder body for moving said holder body in a direction perpendicular to a sliding direction of said slide member as said holder body is moved from said retracted position to said extended position.

5. A cup holder as recited in claim 4, wherein said holder body comprises a slanted side portion so that a width of a rear part is smaller than a width of a front part of said holder body.

6. A vehicle cup holder, comprising:
   a housing;
   a slide member movably supported by said housing;
   a holder body having at least one opening for a cup, said holder body supported by said slide member for slidable movement between an extended and a retracted position relative to said housing;
   an elastic element attached to said slide member and said holder body to urge said holder body relative to said housing in a direction perpendicular to a sliding direction of said slide member when said holder body is at said extended position;
   a stopper mechanism for preventing the holder body from moving in a direction perpendicular to a sliding direction of said slide member in opposition to the urging force of said elastic element when said holder body is at said extended position; and
   wherein the stopper mechanism comprises a claw projecting on the rear part of the holder body and a stopper arm formed on the housing, for engagement with the claw.

7. A cup holder as claimed in claim 6, wherein the holder body has a projecting piece formed close to the claw, while the housing is provided with another projection which is engageable with the projecting piece when the holder body is accommodated in the housing.

8. A vehicle cup holder, comprising:

a housing:

a slide member movably supported by said housing;

a holder body having at least one opening for a cup, said holder body supported by said slide member for slidable movement between an extended and a retracted position relative to said housing;

an elastic element attached to said slide member and said holder body to urge said holder body relative to said housing in a direction perpendicular to a sliding direction of said slide member when said holder body is at said extended position;

a stopper mechanism for preventing the holder body from moving in a direction perpendicular to a sliding direction of said slide member in opposition to the urging force of said elastic element when said holder body is at said extended position; and wherein the holder body has a receiver pivoted thereto for receiving a bottom of the cup by one end of the receiver and the stopper mechanism comprises an extension piece formed on the other end of the receiver and an engagement hole formed in the housing for engagement with the extension piece.

\* \* \* \* \*